(12) United States Patent
Huang

(10) Patent No.: US 9,834,865 B2
(45) Date of Patent: *Dec. 5, 2017

(54) CENTRIFUGAL SOLUTION SPUN NANOFIBER PROCESS

(75) Inventor: Tao Huang, Downington, PA (US)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 639 days.

This patent is subject to a terminal disclaimer.

(21) Appl. No.: 12/335,816

(22) Filed: Dec. 16, 2008

(65) Prior Publication Data

US 2009/0160099 A1    Jun. 25, 2009

Related U.S. Application Data

(60) Provisional application No. 61/007,881, filed on Dec. 17, 2007.

(51) Int. Cl.
| | |
|---|---|
| *D01D 5/18* | (2006.01) |
| *B82Y 30/00* | (2011.01) |
| *D01D 5/00* | (2006.01) |
| *B82Y 40/00* | (2011.01) |
| *D01D 5/14* | (2006.01) |

(52) U.S. Cl.
CPC ............. *D01D 5/18* (2013.01); *B82Y 30/00* (2013.01); *D01D 5/0069* (2013.01); *B82Y 40/00* (2013.01); *D01D 5/003* (2013.01); *D01D 5/14* (2013.01)

(58) Field of Classification Search
USPC .......................................... 264/211.1, 8, 205
See application file for complete search history.

(56) References Cited

U.S. PATENT DOCUMENTS

| | | | | |
|---|---|---|---|---|
| 4,178,336 A | * | 12/1979 | Snowden | 264/8 |
| 4,294,783 A | * | 10/1981 | Snowden | 264/8 |
| 4,348,341 A | * | 9/1982 | Furuya et al. | 264/8 |
| 4,675,140 A | | 6/1987 | Sparks et al. | |
| 4,861,653 A | | 8/1989 | Parrish | |
| 8,257,778 B2 | * | 9/2012 | Larsen et al. | 427/2.31 |
| 2002/0089094 A1 | * | 7/2002 | Kleinmeyer et al. | 264/465 |
| 2006/0012084 A1 | * | 1/2006 | Armantrout et al. | 264/465 |
| 2008/0029617 A1 | | 2/2008 | Marshall et al. | |
| 2008/0242171 A1 | * | 10/2008 | Huang et al. | 442/51 |
| 2009/0136651 A1 | * | 5/2009 | Larsen et al. | 427/2.31 |

FOREIGN PATENT DOCUMENTS

| | | |
|---|---|---|
| CN | 1472373 A | 3/2003 |
| CN | 1472373 | 2/2004 |
| WO | WO2007/110783 | 10/2007 |
| WO | WO2007/126674 | 11/2007 |

OTHER PUBLICATIONS

Weitz, R.T. "Polymer Nanofibers via nozzle-free Centrifugal Spinning" vol. 8 No. 4, Feb. 28.*
PCT International Search Report and Written opinion for International Application No. PCT/US2008/087058 dated Dec. 12, 1007.
Weitz, R.T. "Polymer Nanofibers via nozzle-free Centrifugal Spinning" vol. 8 No. 4, Feb. 28, 2008 abstract.

* cited by examiner

*Primary Examiner* — Benjamin A Schiffman

(57) ABSTRACT

The invention relates to a process for forming nanofibers from a spinning solution utilizing a high speed rotating spin disk having a flat surface. The nanofibers can be collected into a uniform web for selective barrier end uses.

20 Claims, 8 Drawing Sheets

CENTRIFUGAL SOLUTION SPUN NANOFIBER PROCESS

CROSS REFERENCED TO RELATED APPLICATION

This application claims priority under 35 U.S.C. §119 from U.S. Provisional Application Ser. No. 61/007,881 (filed Dec. 17, 2007), the disclosure of which is incorporated by reference herein for all purposes as if fully set forth.

FIELD OF THE INVENTION

This invention relates to a process for forming nanofibers and fibrous webs. In particular, nanofibers can be made and collected into a fibrous web useful for selective barrier end uses such as filters, battery separators, and breathable medical gowns.

BACKGROUND OF THE INVENTION

Rotary sprayers used in conjunction with a shaping fluid and an electrical field are useful in atomizing paint for coating a target device. The centrifugal force supplied by the rotary sprayers produces enough shear to cause the paint to become atomized and the shaping fluid and electrical field draw the atomized paint to the target device. This process has been optimized for the production of atomized droplets. Defects occur when too many atomized droplets agglomerate into larger entities. The prior art teaches toward making atomized droplets and not larger entities.

There is a growing need for very fine fibers and fibrous webs made from very fine fibers. These types of webs are useful for selective barrier end uses. Presently very fine fibers are made from melt spun "islands in the sea" cross section fibers, split films, some meltblown processes, and electrospinning. What is needed is a high throughput process to make very fine fibers and uniform fibrous webs.

SUMMARY OF THE INVENTION

The present invention provides a high throughput process to make nanofibers and uniform webs by the use of a high speed rotating spin disk.

In a first embodiment, the present invention is directed to a nanofiber forming process comprising the steps of supplying a spinning solution having at least one polymer dissolved in at least one solvent at a temperature between about 100° C. and the freezing point of the solvent to a rotating spin disk with a rotational speed between about 4,000 rpm and about 100,000 rpm, the spin disk having a flat surface and a forward surface discharge edge, issuing the spinning solution from the spin disk along the flat surface so as to fully wet the flat surface of the spin disk and to distribute the spinning solution as a film toward the forward surface of the discharge edge of the spin disk, and forming separate fibrous streams from the spinning solution while the solvent vaporizes to produce polymeric nanofibers.

In a second embodiment, the present invention is directed to a nanofiber forming process comprising the steps of supplying a spinning solution having at least one polymer dissolved in at least one solvent at a temperature between about 100° C. and the freezing point of the solvent to a rotating spin disk with a rotational speed between about 4,000 rpm and about 100,000 rpm, the spin disk having a flat surface and a forward surface discharge edge wherein the spin disk has a concave region relative to the flat surface concentrically located within 40% of the radial distance to the center of the spin disk that defines a reservoir and issuing the spinning solution to the reservoir, issuing the spinning solution from the spin disk along the flat surface so as to fully wet the flat surface of the spin disk and to distribute the spinning solution as a film toward the forward surface of the discharge edge of the spin disk, and forming separate fibrous streams from the spinning solution while the solvent vaporizes to produce polymeric nanofibers.

DETAILED DESCRIPTION OF THE INVENTION

The invention relates to a process for forming nanofibers from a spinning solution utilizing a high speed rotating spin disk having a flat surface.

The term "nanofibers" refers to fibers having diameters varying from a few tens of nanometers up to several hundred nanometers, but generally less than about one micrometer, even less than about 0.8 micrometer, and even less than about 0.5 micrometer.

The solution spun fabrics and webs of the present invention include at least one layer of polymeric nanofibers. The nanofibers have average fiber diameters of less than about 1 μm, preferably between about 0.1 μm and about 1 μm, and high enough basis weights to satisfy a variety of commercial end-uses, such as for air/liquid filtration media, battery and capacitor separators, protective apparel and the like.

The spinning solution comprises at least one polymer dissolved in at least one solvent. Any fiber forming polymer able to dissolve in a solvent that can be vaporized can be used. Suitable polymers include polyalkylene oxides, poly (meth)acrylates, polystyrene based polymers and copolymers, vinyl polymers and copolymers, fluoropolymers, polyesters and copolyesters, polyurethanes, polyalkylenes, polyamides, polyaramids, thermoplastic polymers, liquid crystal polymers, engineering polymers, biodegradable polymers, bio-based polymers, natural polymers, and protein polymers. Generally, a spinning solution with a viscosity from about 10 cP to about 100,000 cP, more advantageously from about 100 cP to about 75,000 cP and most advantageously from about 1,000 cP to about 50,000 cP is useful.

Figure 1:
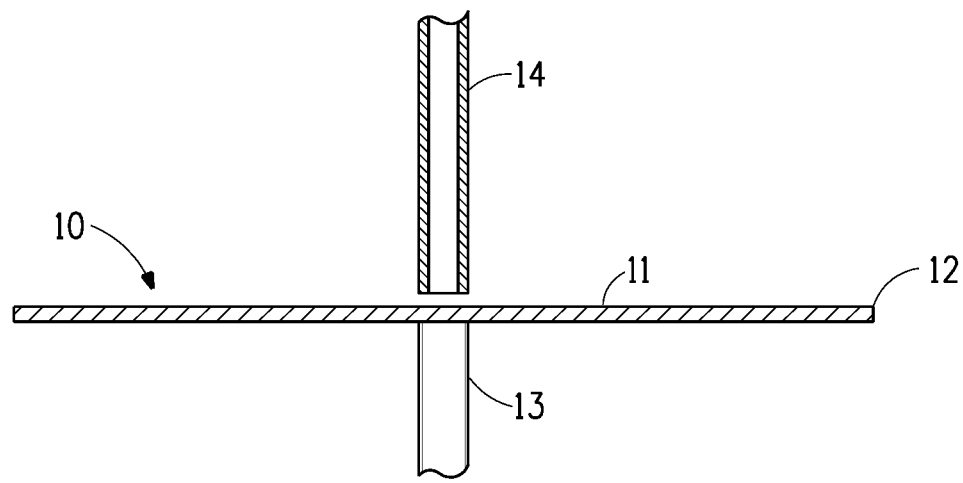
FIG. 1 is a cross sectional view of a rotating spin disk having a flat surface suitable for use in the present invention.

FIG. 1 is an illustration of a rotating spin disk suitable for forming nanofibers from the spinning solution. The rotating spin disk can be used in the spinneret portion of a rotary sprayer apparatus or centrifugal spinning apparatus (not shown). The rotating spin disk 10 having a flat surface 11 and a forward surface discharge edge 12 is mounted on a drive shaft 13 which is connected to a high speed motor (not shown). A spinning solution is prepared by dissolving at least one polymer in at least one solvent. The spinning solution at a temperature between about 100° C. and the freezing point of the solvent is pumped through a supply tube 14 running coaxially with drive shaft 13 and in close proximity to the center of spin disk 10 on the side of spin disk 10 opposite the side attached to drive shaft 13. The throughput rate of the solution is from about 1 cc/min to about 500 cc/min. As the spinning solution exits the supply tube 14 it is directed into contact with a rotating spin disk 10 and travels along flat surface 11 so as to fully wet the flat surface of the spin disk and to distribute the spinning solution as a film until it reaches forward surface discharge edge 12. A rotational speed of the spin disk 10 is between about 4,000 rpm and about 100,000 rpm, more advantageously between about 6,000 rpm and about 100,000 rpm and most advantageously between about 8,000 rpm and about 100,000 rpm. The forward surface discharge edge 12 can be sharp or rounded and can include serrations or dividing ridges. The rotation speed of the spin disk 10 propels the spinning solution along flat surface 11 and past the forward surface discharge edge 12 to form separate fibrous streams, which are thrown off the discharge edge by centrifugal force. Simultaneously, the solvent vaporizes until nanofibers of the invention are formed. The nanofibers can be collected on a collector (not shown) to form a fibrous web.

Figure 2:
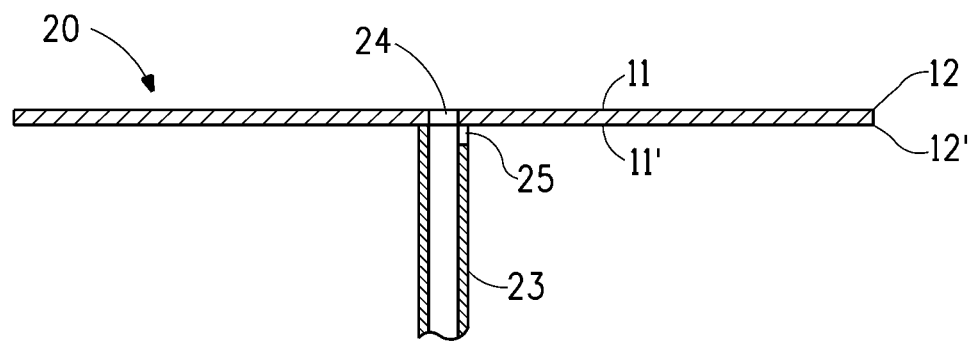
FIG. 2 is a cross sectional view of a rotating spin disk having a flat surface suitable for use in the present invention.

Alternatively, FIG. 2 shows the spinning solution being delivered to spin disk 20 via a coaxial hollow portion of drive shaft 23. The spinning solution can either exit the hollow portion of drive shaft 23 via an outlet 24 located at the center of spin disk 20 on the side opposite the side that is attached to drive shaft 23 along flat surface 11 and past the forward surface discharge edge 12 or via one or more outlets 25 (one is shown) preferably symmetrically positioned around and through drive shaft 23 adjacent spin disk 20 along flat surface 11' and past the forward surface discharge edge 12' or via both types of outlets.

Figure 3:
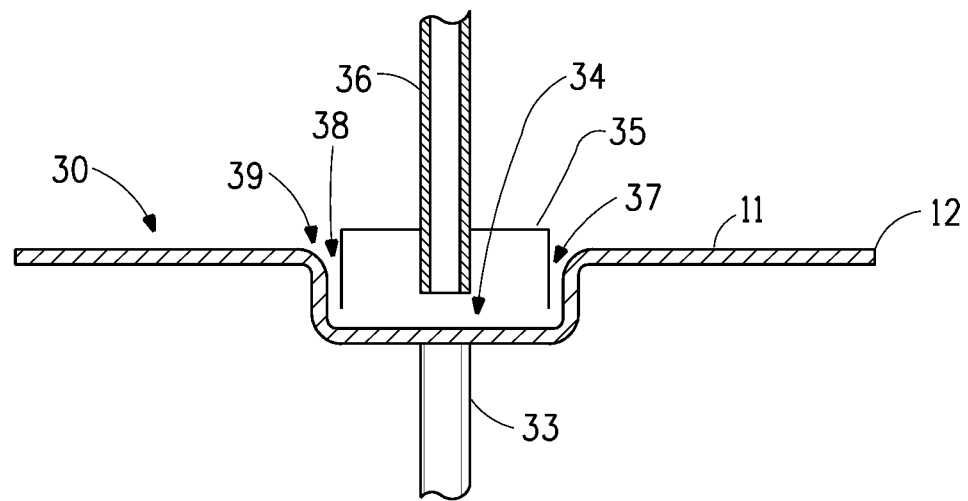
FIGS. 3-6 are a cross sectional view of rotating spin disks having a flat surface and a reservoir suitable for use in the present invention.

FIG. 3 is an illustration of another embodiment of a rotating spin disk suitable for forming nanofibers from the spinning solution. The rotating spin disk 30 having a flat surface 11 and a forward surface discharge edge 12 is mounted on a drive shaft 33 which is connected to a high speed motor (not shown). Spin disk 30 has a concave region 34 relative to the flat surface concentrically located within 40% of the radial distance to the center of the spin disk 30 located on the side opposite of the side attached to drive shaft 33. This concave region 34 defines a reservoir for receiving the spinning solution. Optionally, the reservoir can be encapsulated with a housing 35 with a coaxial inlet for receiving the spinning solution via spinning supply tube 36 and one or more outlets 37 preferably symmetrically positioned around housing 35 for discharging the spinning solution. A gap 38 can exist between the outlet 37 and a perpendicular portion of the flat surface of the spin disk 30 that defines the concave region. A spin disk inner edge 39 is located where the perpendicular portion of the spin disk meets the flat surface 11 of the spin disk. The spin disk inner edge 39 can be rounded or sharp.

Figure 4:
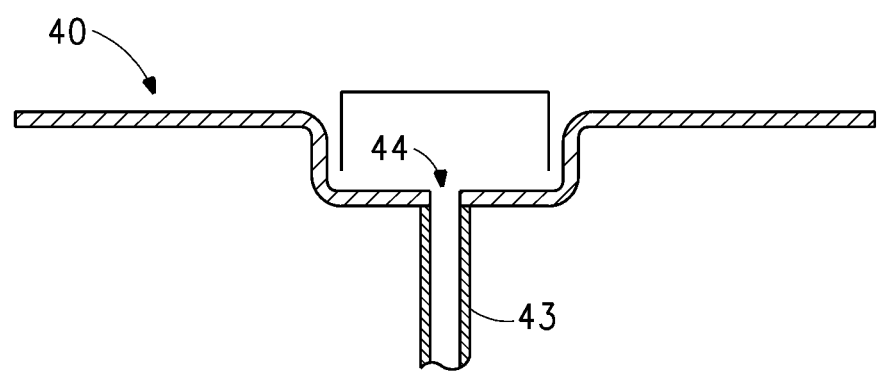

Alternatively, FIG. 4 is similar to FIG. 3 except FIG. 4 shows the spinning solution being delivered to spin disk 40 via a coaxial hollow portion of drive shaft 43. The spinning solution can exit the hollow portion of drive shaft 43 via an outlet 44 located at the center of spin disk 40 on the side opposite the side that is attached to drive shaft 43.

Figure 5:
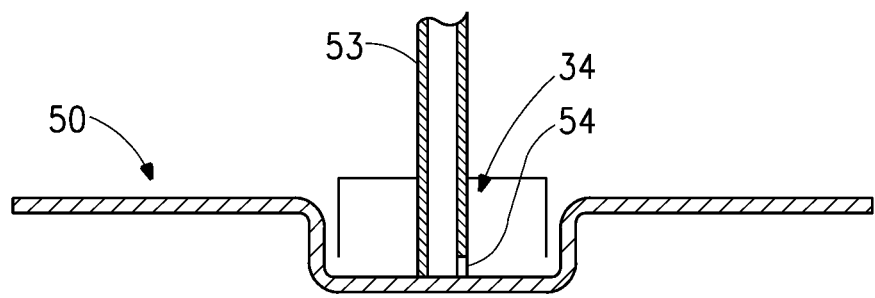

Alternatively, FIG. 5 is similar to FIG. 4 except FIG. 5 shows the spinning solution being delivered to spin disk 50 via a coaxial hollow portion of drive shaft 53 which is located on the same side of spin disk 50 as the side with concave portion 34. The spinning solution can exit the hollow portion of drive shaft 53 via one or more preferably symmetrical outlets 54 through drive shaft 53 adjacent spin disk 50.

Figure 6:
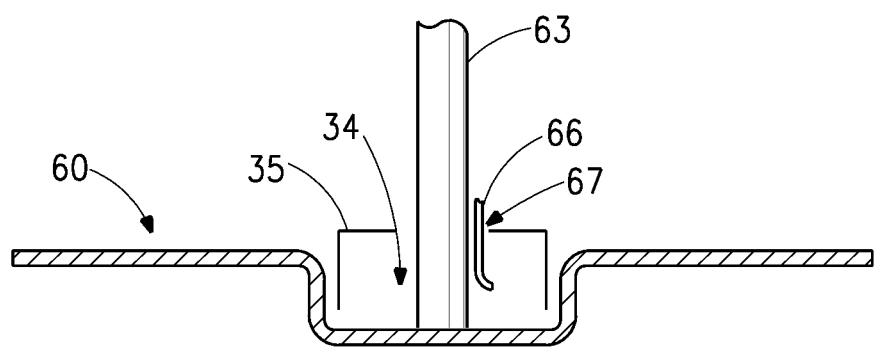

Alternatively, FIG. 6 is similar to FIG. 5 except FIG. 6 shows the spinning solution being delivered to spin disk 60 via a supply tube 66 passing through housing 35 at inlet 67. Spin disk 60 is attached to drive shaft 63 which is located on the same side of spin disk 60 as the side with concave portion 34.

Optionally, shaping fluid can flow around the spin disks to direct the spinning solution away from the spin disks. The fluid can be delivered via nozzles positioned in an annular configuration to the rotating spin disk. The shaping fluid can be a gas. Various gases and at various temperatures can be used to decrease or to increase the rate of solvent vaporization to affect the type of nanofiber that is produced. Thus, the shaping gas can be heated or cooled in order to optimize the rate of solvent vaporization. Suitable gases to use are air and nitrogen, but any other gas which does not detrimentally affect the formation of nanofibers can be used.

Optionally, an electrical field can be added to the process. A voltage potential can be added between the spin disk and the collector. Either the spin disk or the collector can be charged with the other component substantially grounded or they can both be charged so long as a voltage potential exists between them. In addition, an electrode can be positioned between the spin disk and the collector wherein the electrode is charged so that a voltage potential is created between the electrode and the spin disk and/or the collector. The electrical field has a voltage potential of about 1 kV to about 150 kV. Surprisingly, the electrical field seems to have little effect on the average fiber diameter, but does help the nanofibers to separate and travel toward a collector so as to produce a more uniform fibrous web.

This process can make nanofibers, preferably continuous nanofibers, with an average fiber diameter of less than about 1,000 nm, more advantageously less than about 500 nm, and most advantageously less than about 100 nm. The nanofibers can be collected on a collector into a fibrous web. The collector can be conductive for creating an electrical field between it and the spin disk or an electrode. The collector can also be porous to allow the use of a vacuum device to pull vaporized solvent and optionally shaping gas away from the nanofibers and help pin the nanofibers to the collector to make the fibrous web. A scrim material can be placed on the collector to collect the nanofiber directly onto the scrim thereby making a composite material. For example, a spunbond nonwoven can be placed on the collector and the nanofiber deposited onto the spunbond nonwoven. In this way composite nonwoven materials can be produced.

Test Methods

In the description above and in the non-limiting examples that follow, the following test methods were employed to determine various reported characteristics and properties.

Viscosity was measured on a Thermo RheoStress 600 rheometer equipped with a 20 mm parallel plate. Data was collected over 4 minutes with a continuous shear rate ramp from 0 to 1,000 s$^{-1}$ at 23° C. and reported in cP at 10 s$^{-1}$.

Fiber Diameter was determined as follows. Ten scanning electron microscope (SEM) images at 5,000× magnification were taken of each nanofiber layer sample. The diameter of eleven (11) clearly distinguishable nanofibers were measured from each SEM image and recorded. Defects were not included (i.e., lumps of nanofibers, polymer drops, intersections of nanofibers). The average fiber diameter for each sample was calculated and reported in nanometers (nm).

EXAMPLES

Hereinafter the present invention will be described in more detail in the following examples.

Example 1 describes making a poly(ethylene oxide) continuous nanofiber with a flat spin disk. Comparative Example A describes making a poly(ethylene oxide) continuous fiber with a concave spin disk of the prior art. Example 2 describes making a poly(ethylene oxide) continuous nanofiber with a flat spin disk containing a reservoir. Example 3 describes making a poly(ethylene oxide) continuous nanofiber with a large flat spin disk containing a reservoir. Example 4 describes making a poly(vinyl alcohol) continuous nanofiber with a large flat spin disk containing a reservoir.

Example 1

Figure 7:
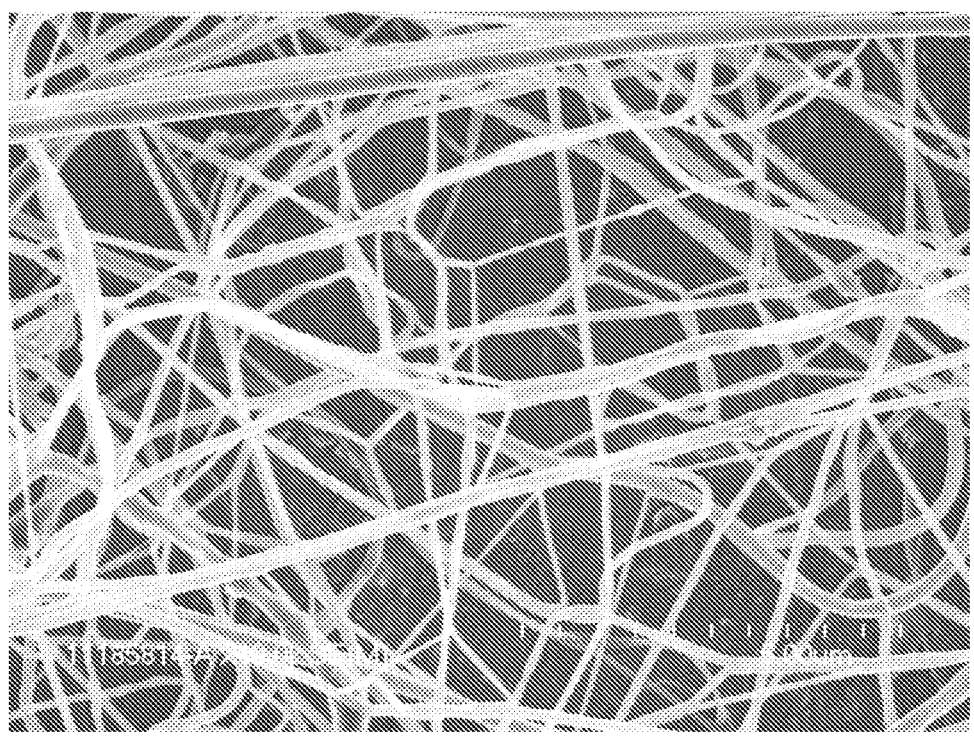
FIG. 7 is a scanning electron micrograph of poly(ethylene oxide) nanofibers made with a flat spin disk from Example 1.

Continuous nanofibers were made using a lab scale spin unit with a flat disk driven (such as illustrated in FIG. 1) by a high-speed electrical motor. A spinning solution of 8.0 wt % poly(ethylene oxide) with an average molecular weight (Mw) of about 300,000 and 92.0% water by weight was mixed until homogeneous and poured into a syringe pump for delivery to the rotational flat disk with a 3.0 cm diameter through the supply tube with a flow rate of about 2 cc/min. The rotation speed was set to a constant 40,000 rpm. The solution viscosity was 3,150 cP at 25° C. No electrical field was used during this test. Nanofibers were collected on an aluminum foil that was held in tubular shape about 25 cm in diameter surround the spinning disk, and the spinning disk was placed at the center of the tubular collector. There was no shaping fluid applied. An SEM image of the nanofibers can be seen in FIG. 7. The fiber size was measured from images of the nanofibers collected on aluminum foil using SEM. The fiber diameters were measured from 643 counts of nanofibers and determined to be in the range of 20 nm to 500 nm with a median value of 127 nm. The average fiber diameter was 141 nm with a standard deviation of 62 nm with a 95% confidence interval.

Comparative Example A

Figure 8:
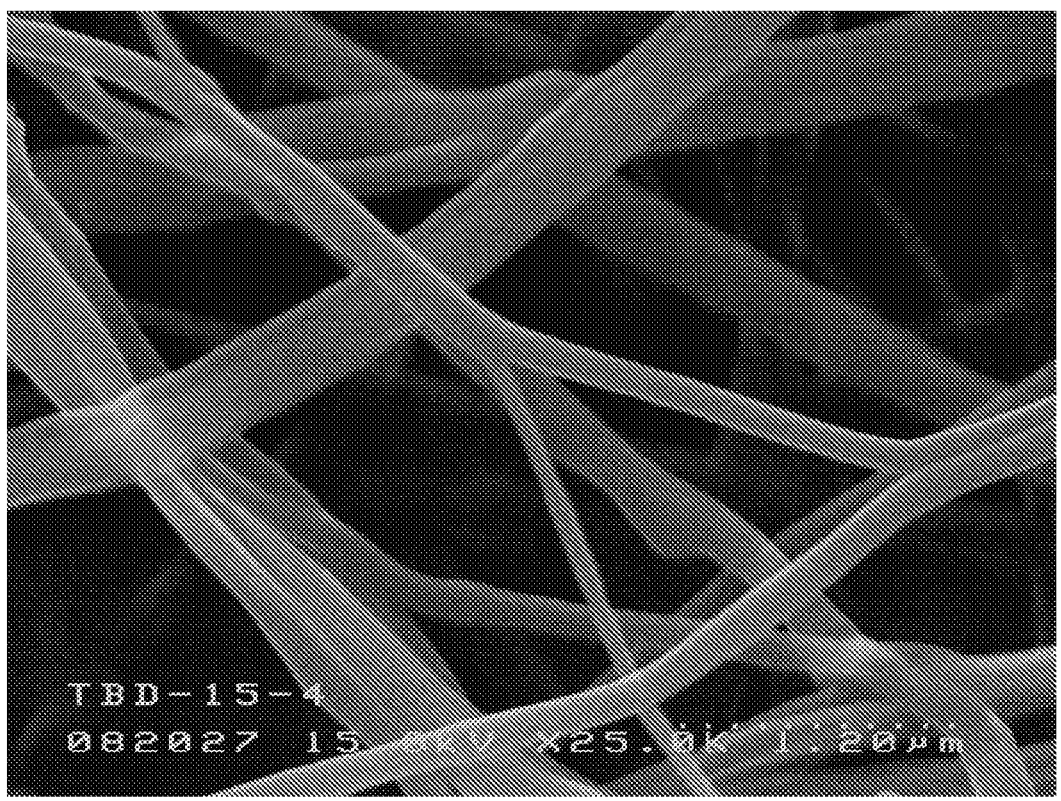
FIG. 8 is a scanning electron micrograph of poly(ethylene oxide) nanofibers made from a concave shaped spin disk from Comparative Example A.

Continuous fibers were made using a standard ITW TurboDisk atomizer with a special 20 hole turbine plate, and control enclosure for high voltage and turbine speed control from ITW Automotive Finishing Group. The Pulse Track System is used to maintain constant speed of the rotary atomizer during the coating application. High voltage is provided from voltage master power supply. A spinning solution of 10.0% poly(ethylene oxide) with an Mw of about 300,000 and 92.0% water by weight was mixed until homogeneous, and poured into a 3:1 2.54 cm diaphragm pump for delivery to the rotational disk atomizer through the supply tube with a constant flow rate of 60 cc/min. A 15 cm diameter concave-shaped spin disk was used. The rotation speed was set to a constant 27,000 rpm. A +50 kV power supply was used in current control mode and the current was set to 0.02 am. The high voltage ran at about 73 kV during this test. The solution viscosity was 12,500 cP at 25° C. The disk was serrated with about 937 pitches at the edge of the disk. Fibers were collected on aluminum foil that was held in tubular shape about 284 cm in diameter surrounding the spinning disk, and the spinning disk was placed at the center of the tubular collector. There was no shaping air applied. An SEM image of the fibers can be seen in FIG. 8. The fiber size was measured from images of the fibers collected on aluminum foil using SEM. The fiber diameters were measured from 660 counts of fibers and determined to be in the range of 32 nm to 502 nm with a median value of 182 nm. The average fiber diameter was 191 nm with a standard deviation of 76 nm, with a 95% confidence interval.

Example 2

Figure 9:
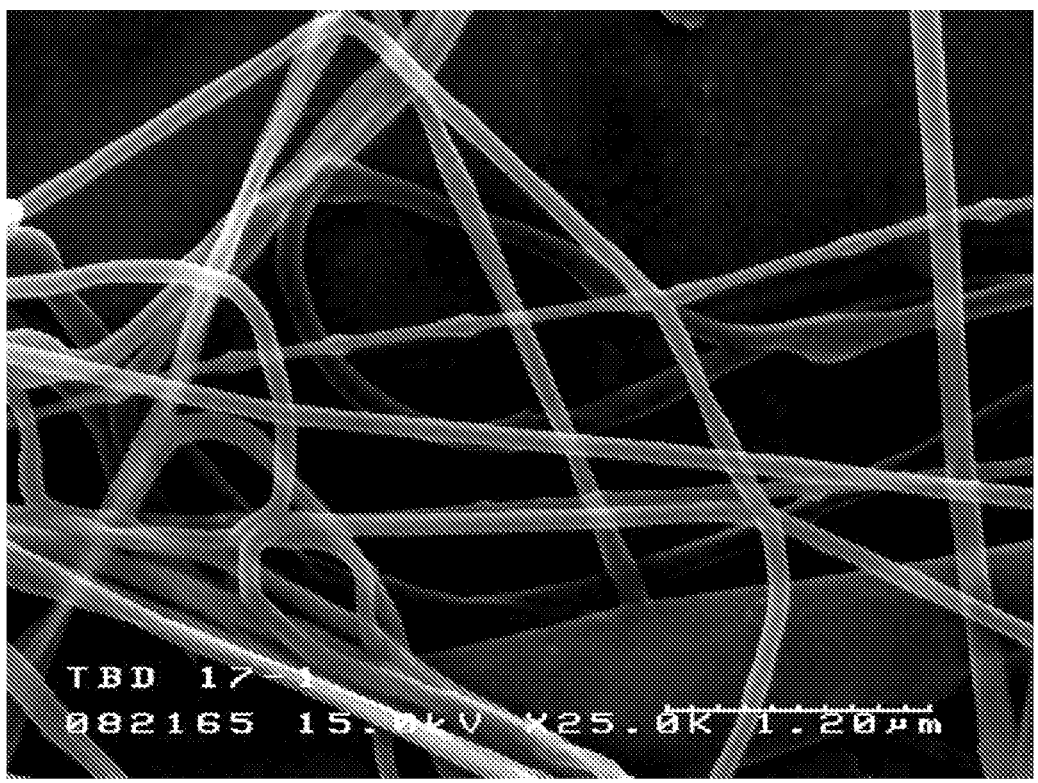
FIG. 9 is a scanning electron micrograph of poly(ethylene oxide) nanofibers made with a flat spin disk with a reservoir from Example 2.

Example 2 was prepared similarly to Comparative Example A, except a 15 cm flat spin disk with reservoir and disk inner edge (such as illustrated in FIG. 6) was used. All test conditions were identical as Comparative Example A. An SEM image of the nanofibers can be seen in FIG. 9. The fiber size was measured from images of the nanofibers collected on aluminum foil using SEM. The fiber diameters were measured from 571 counts of nanofibers and determined to be in the range of 23 nm to 190 nm with a median value of 82 nm. The average fiber diameter was 84 nm with a standard deviation of 27 nm, with a 95% confidence interval.

The flat spin disk with reservoir used in Example 2 made smaller fiber diameter fibers than the concave spin disk of Comparative Example A.

Example 3

Figure 10:
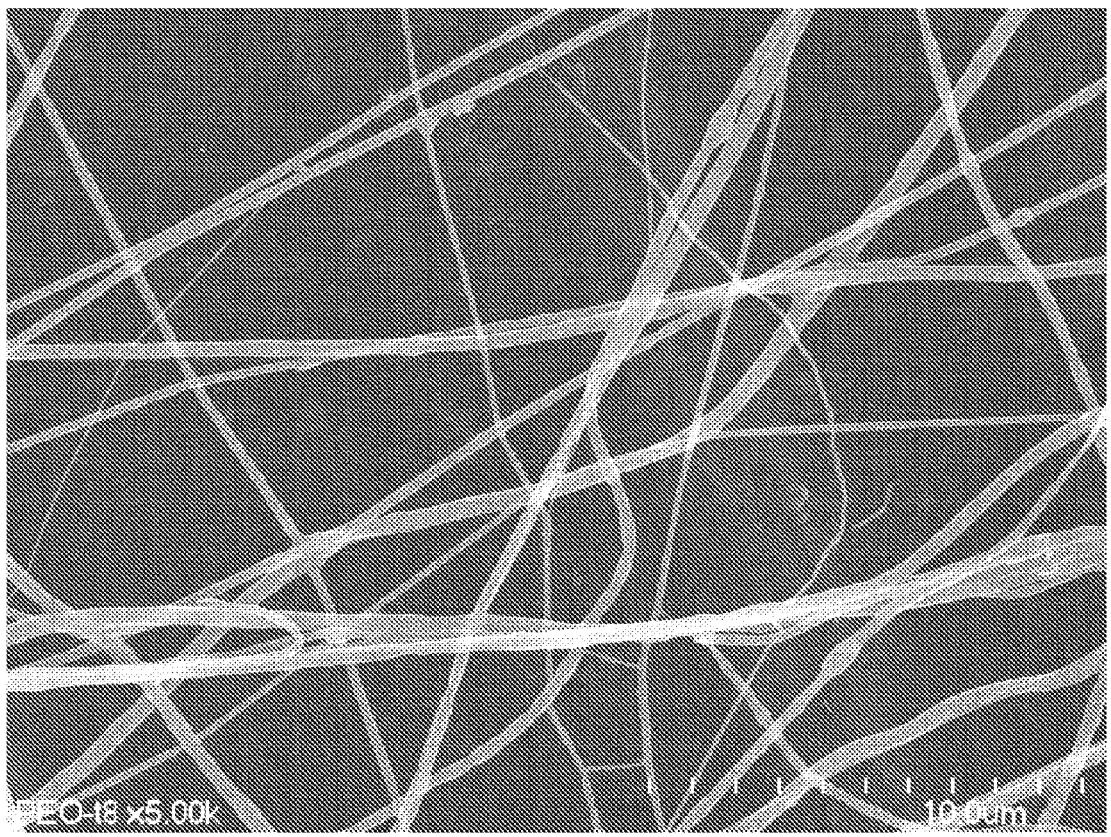
FIG. 10 is a scanning electron micrograph of poly(ethylene oxide) nanofibers made with a flat spin disk with a reservoir from Example 3.

Example 3 was prepared similarly to Example 2, except a 30 cm flat spin disk with reservoir and disk inner edge was used. A spin solution of 12.0% poly(ethylene oxide) with an Mw of about 300,000 and 88.0% water was used. The viscosity of this solution was 34,000 cP at 25° C. In this test, a much higher flow rate was used at 200 cc/min, and the disk rotation speed was 21,000 rpm. There was no shaping air applied. An SEM image of the nanofibers can be seen in FIG. 10. The fiber size was measured from images of the nanofibers collected on aluminum foil using SEM. The fiber diameters were measured from 790 counts of nanofibers and determined to be in the range of 52 nm to 716 nm with a median value of 222 nm. The average fiber diameter was 254 nm with a standard deviation of 122 nm, with a 95% confidence interval.

Example 4

Figure 11:
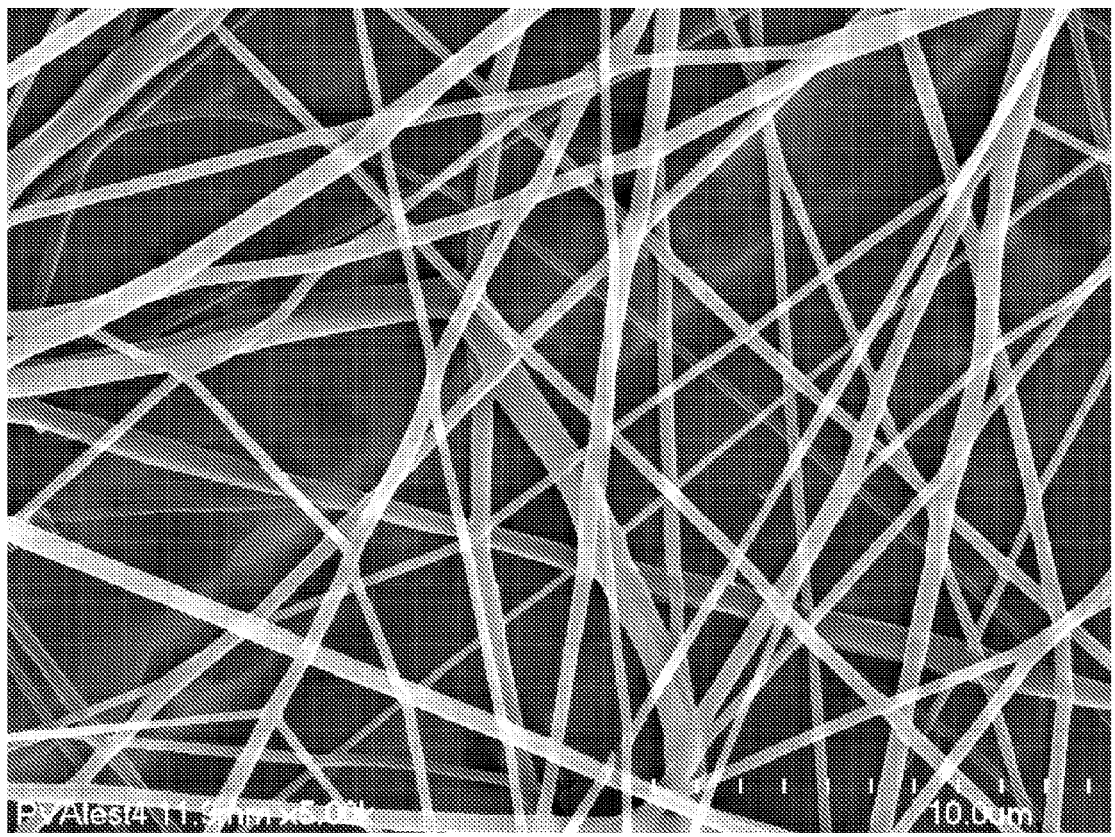
FIG. 11 is a scanning electron micrograph of poly(vinyl alcohol) nanofibers made with a flat spin disk with a reservoir from Example 4.

Example 4 was prepared similarly to Example 3. A 30 cm flat spin disk with reservoir and disk inner edge was used. A spin solution of 15% poly(vinyl alcohol) (DuPont Evanol 80-18) and 85% water by weight was used. The viscosity of this solution is 5,850 cP at 25° C. In this test, the flow rate was set as 33 cc/min, and the disk rotation speed was 8,000 rpm. There was no shaping air applied. An SEM image of the nanofibers can be seen in FIG. 11. The fiber size was measured from images of the nanofibers collected on aluminum foil using SEM. The fiber diameters were measured from 323 counts of nanofibers and determined to be in the range of 98 nm to 665 nm with a median value of 264 nm. The average fiber diameter was 277 nm with a standard deviation of 172 nm, with a 95% confidence interval.

What is claimed is:

1. A nanofiber forming process comprising the steps of: supplying a spinning solution having at least one polymer dissolved in at least one solvent at a temperature between about 100° C. and the freezing point of the solvent to a rotating flat spin disk with a rotational speed between about 4,000 rpm and about 100,000 rpm, the flat spin disk having a flat surface and a forward surface discharge edge located in the plane of the rotating flat spin disk at the circumference of the flat surface; issuing the spinning solution from the flat spin disk along the flat surface so as to fully wet the flat surface of the flat spin disk and to distribute the spinning solution as a film toward the forward surface discharge edge of the flat spin disk; the rotational speed of the flat spin disk propelling the spinning solution along the flat surface of the flat spin disk past the forward surface discharge edge to form separate fibrous streams from the spinning solution in the plane of the flat spin disk while the solvent vaporizes to produce polymeric nanofibers of diameter 800 nm or less; wherein the flat surface defines a plane, the plane is perpendicular to the axis of rotation of the flat spin disk, and the surface and the forward discharge edge are all in the plane.

2. The process of claim 1, wherein the polymer is selected from the group comprising polyalkylene oxides, poly(meth)acrylates, polyolefins, polystyrene based polymers and copolymers, vinyl polymers and copolymers, fluoropolymers, polyesters and copolyesters, polyurethanes, polyalkylenes, polyamides, polyaramids, thermoplastic polymers, liquid crystal polymers, engineering polymers, biodegradable polymers, bio-based polymers, natural polymers, and protein polymers.

3. The process of claim 1, wherein the spinning solution has a viscosity from about 10 cP to about 100,000 cP.

4. The process of claim 3, wherein the spinning solution has a viscosity from about 100 cP to about 75,000 cP.

5. The process of claim 4, wherein the spinning solution has a viscosity from about 1,000 cP to about 50,000 cP.

6. The process of claim 1, wherein the spinning solution is supplied at a throughput rate from about 1 cc/min to about 500 cc/min.

7. The process of claim 1, wherein the rotational speed of the flat spin disk is between about 6,000 rpm and about 100,000 rpm.

8. The process of claim 7, wherein the rotational speed of the flat spin disk is between about 8,000 rpm and about 100,000 rpm.

9. The process of claim 1, wherein the average fiber diameter is less than about 500 nm.

10. The process of claim 9, wherein the average fiber diameter is less than about 100 nm.

11. The process of claim 1, further comprising flowing a shaping fluid around the flat spin disk to direct the spinning solution away from the flat spin disk.

12. The process of claim 11, wherein the shaping fluid comprises a gas.

13. The process of claim 12, wherein the gas is air or nitrogen and can be heated or cooled.

14. The process of claim 1, further comprising collecting the nanofiber onto a collector to form a fibrous web.

15. The process of claim 14, further comprising applying a vacuum through the collector to pull the nanofibers onto the collector to form a fibrous web.

16. The process of claim 1 further comprising providing an electric field while forming separate fibrous streams from the spinning solution while the solvent vaporizes to produce polymeric nanofibers.

17. The process of claim 16, wherein the electrical field has a voltage potential of about 1 kV to about 150 kV.

18. The process of claim 17, further comprising the step of collecting the fiber on a collector into a fibrous web and applying a vacuum through the collector to pull the nanofibers onto the collector to form the fibrous web.

19. The process of claim 18, wherein the voltage potential is maintained between the flat spin disk and the collector.

20. The process of claim 18, wherein the voltage potential is maintained between the flat spin disk and an electrode positioned between the flat spin disk and the collector.

* * * * *